P. H. UNSINGER.
PICKLE SPEAR.
APPLICATION FILED DEC. 30, 1916.
1,275,504.
Patented Aug. 13, 1918.
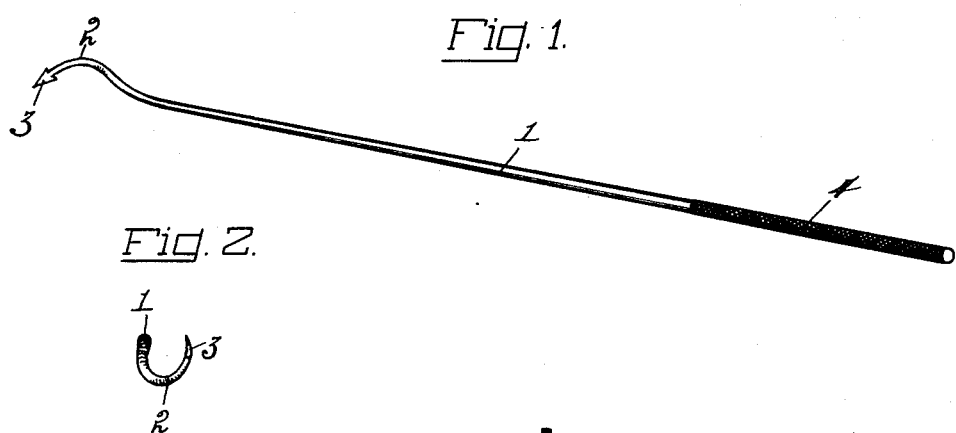
INVENTOR
Philip H. Unsinger,
By Owen, Owen & Crampton,
His attys.

UNITED STATES PATENT OFFICE.

PHILIP H. UNSINGER, OF FREMONT, OHIO.

PICKLE-SPEAR.

1,275,504.  Specification of Letters Patent.  Patented Aug. 13, 1918.

Application filed December 30, 1916. Serial No. 139,763.

*To all whom it may concern:*

Be it known that I, PHILIP H. UNSINGER, a citizen of the United States, and a resident of Fremont, in the county of Sandusky and State of Ohio, have invented a certain new and useful Pickle-Spear; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a tool particularly intended for use in removing olives, pickles or the like from bottles, jars or other containers.

It is well understood that it is a difficult matter to remove olives, pickles, or the like, from bottles or jars containing a liquid, by the use of a fork, especially if the olives or pickles are floating in the liquid, and it is the object of my invention to provide a tool which is capable of being used to easily and quickly spear the olives or pickles floating in the liquid within the bottle or jar and to remove them therefrom.

The invention is fully described in the following specification, and while, in its broader aspect, it is capable of embodiment in numerous forms, a preferred embodiment thereof is illustrated in the accompanying drawing, in which—

Figure 1 is a perspective view of a tool embodying the invention. Fig. 2 is an end view thereof, and Fig. 3 is a view thereof inserted into a bottle and in the act of being engaged to an olive.

Referring to the drawings, the tool embodying my invention is shown as comprising a shank or handle part 1 in the form of a rod with one end spirally shaped, as at 2, and terminating in a point or spear head 3, which is sharp at its outer end to adapt it to easily penetrate the skin of an olive or pickle and has shoulders at the rear of its point to facilitate a retaining of the engaged olive or pickle on the spear. The spiral part 2, in the present instance, forms approximately one-half of a complete convolution with the spear head or point 3 thereof disposed in transversely offset relation to the axial line of the handle part 1, which line registers with the axis of the semi-circle formed by the spiral 2.

The outer end of the handle 1 is preferably knurled, as at 4, to facilitate a turning of the tool by the fingers holding the same. It is evident that a turning of the tool about the longitudinal axis of its handle will cause a revoluble movement of the spear head 3 and adapt it to exert a transverse spearing thrust against an olive, pickle or other object disposed at one side of the axial line of the handle as illustrated in Fig. 3. If the object which it is desired to engage by the spear is floating in a liquid, such object may be moved to adjacent one side wall of the container in which it is disposed and the point of the spear then placed against one side of the object in opposition to the adjacent wall of the container and the spear given a twisting movement to effect a spiral turning of the spear head into the object, thus rendering it exceptionally easy to engage a floating object and withdraw it from the container.

While this tool is particularly intended for use in removing olives, pickles, or the like, from bottles or jars, it is also adapted for table use as a pickle spear as the spiral form of the pickle engaging end thereof enables it to be easily engaged with a pickle, and the pickle can then be easily removed therefrom by placing it on a plate and then giving the spear a backward turning movement to withdraw the spear end therefrom.

I wish it understood that my invention is not limited to any specific construction, arrangement or form of the parts, except in so far as such limitations are specified in the claim.

Having thus described my invention, what I claim as new, and desire to secure by Letters Patent, is—

A pickle spear comprising a single rod forming a handle at one end and having its other end tapering to reduce its size and terminating in a single spiral bend of decided pitch which is pointed at its free end with the point transversely offset from the axial line of the handle and formed with a spear head.

In testimony whereof, I have hereunto signed my name to this specification.

PHILIP H. UNSINGER.